United States Patent Office 2,908,665
Patented Oct. 13, 1959

2,908,665

EMULSION POLYMERIZATION WITH TRISUBSTITUTED HYDROPEROXY METHANES

William B. Reynolds and John E. Wicklatz, Bartlesville, Okla., and Thomas J. Kennedy, Borger, Tex., assignors to Phillips Petroleum Company, a corporation of Delaware No Drawing. Application May 8, 1953
Serial No. 353,886

6 Claims. (Cl. 260—63)

This invention relates to an improved process for polymerizing unsaturated organic compounds while dispersed in an aqueous emulsion. In one important aspect this invention relates to the use of faster recipes at low polymerization temperatures for effecting production of synthetic rubber by emulsion polymerization of conjugated diolefins. This application is a continuation-in-part of our copending application Serial No. 68,736, filed December 31, 1948, and our copending application Serial No. 107,638, filed July 29, 1949, now U.S. 2,665,269.

With the increasing interest in low temperature emulsion polymerization many variations in recipes and procedure have been developed in the interest of economy and efficiency in addition to the attention given to producing polymeric materials having the desired characteristics. Recipes of the redox type, that is, formulations wherein both oxidizing and reducing components are present, have been widely used. Oxidizing components frequently employed include materials of a peroxidic nature, and particularly compounds such as benzoyl peroxide and cumene hydroperoxide. Even though any peroxidic material might be expected to function in the capacity of the oxidant in a redox emulsion polymerization system, this is not necessarily the case since in some instances little, if any, polymerization occurs while in other cases with different peroxides the reaction takes place at a satisfactory rate. Some peroxides may function fairly satisfactorily at higher temperatures but are of little value when it is desired to carry out polymerizations at low temperatures, say below the freezing point of water.

We have now discovered that excellent conversion rates can be obtained in emulsion polymerization systems through the use of initiator, or catalyst, compositions comprising a trisubstituted hydroperoxymethane having at least ten carbon atoms per molecule. Not only are rapid polymerization rates obtained at low polymerization temperatures with these compositions, but with some recipes it is also possible to obtain these advantageous results without having present in the polymerization system any salt of a heavy metal, such as iron. In many instances it is quite desirable to produce a polymeric product completely free from such heavy metals, because of adverse influences of the metal on the physical and chemical properties of the rubber, but with other recipes it has not been feasible to obtain this desired result. The rapid reaction rates obtainable with the recipes of the present invention permit operation at low reaction temperatures, down to as low as −30 or −40° C., or lower.

The hydroperoxymethanes used in the practice of this invention will contain at least ten carbon atoms per molecule, and usually not more than thirty carbon atoms per molecule. They can be represented by the formula $R_3COOH$ wherein each R, individually, is one of the group consisting of aliphatic, cycloaliphatic, aromatic, olefinic, and cycloolefinic radicals. Each of these radicals can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i.e. mercapto compounds and thioethers), and halogen compound. Examples of such hydroperoxides include diisopropylbenzene hydroperoxide (dimethyl-(isopropylphenyl)hydroperoxymethane), methylethyl(ethoxyphenyl)hydroperoxymethane, methyldecyl-(methylphenyl)hydroperoxymethane, dimethyldecylhydroperoxymethane, methylchlorophenylphenylhydroperoxymethane, and tertiarybutylisopropylbenzene hydroperoxide (dimethyl(tertiary-butylphenyl)hydroperoxymethane). Such hydroperoxides can be easily prepared by simple oxidation, with free oxygen, of the corresponding hydrocarbon or hydrocarbon derivative, i.e. of the parent trisubstituted methane. The compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent compound, or unreacted compound may be stripped and the residual material employed. The major active ingredient in such a composition is the monohydroperoxide, or a mixture of monohydroperoxides. This hydroperoxide group appears to result from introduction of two oxygen atoms between the carbon atom of the trisubstituted methane and the single hydrogen atom attached thereto. Where there is another similar grouping in the molecule, the usual method of production just outlined appears to produce substantially the monohydroperoxide even though a dihydroperoxide appears to be structurally possible. Thus, in a simple case, from such an oxidation of diisopropyl benzene the primary product appears to be dimethyl(isopropylphenyl)hydroperoxymethane.

One large group of these hydroperoxymethanes is that group in which each of the three substituent groups is a hydrocarbon radical. One of the subgroups of these compounds is the alkaryl-dialkyl hydroperoxymethanes, in which the two alkyl groups are relatively short, i.e. have from one to three or four carbon atoms each, including dimethyl(tertiarybutylphenyl)hydroperoxymethane, dimethyl(diisopropylphenyl)hydroperoxymethane, dimethyl(isopropylphenyl)hydroperoxymethane, dimethyl(dodecylphenyl)hydroperoxymethane, dimethyl(methylphenyl)hydroperoxymethane, and corresponding methylethyl and diethyl compounds, and the like. Another subgroup includes at least one long alkyl group directly attached to the hydroperoxymethane, such as methyldecyl(methylphenyl)hydroperoxymethane, ethyldecylphenylhydroperoxymethane, and the like. Still another subgroup includes trialkyl compounds, such as dimethyldecylhydroperoxymethane, and the like; aralkyl compounds, such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. These materials preferably will have a total of not more than thirty carbon atoms per molecule. These hydroperoxide compositions not only give faster polymerization rates when used to effect emulsion polymerizations, but their use also frequently results in a more uniform reaction rate over a given reaction period than do hydroperoxides heretofore used. These advantages are particularly pronounced at polymerization temperatures below 10° C., and down to polymerization temperatures as low as —30 or —40° C., or lower.

A particularly useful class of hydroperoxides of this invention has the formula

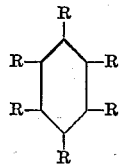

wherein one and only one R group has the structure

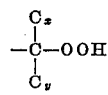

and wherein $x$ and $y$ are positive integers, the sum of $x$ and $y$ being at least 2 and not more than 11, and $C_x$, $C_y$ are straight or branched chain alkyl groups, the remaining R's being selected from the group consisting of hydrogen and alkyl radicals having one to twelve carbon atoms, at least one R group containing exactly 12 carbon atoms and at least two R groups are hydrogen. The molecule should not contain more than 30 carbon atoms.

Specific examples of the compounds of our invention are the hydroperoxides of 2-(isopropylphenyl)dodecane, 3 - (methylphenyl)dodecane, 4 - (tertiarybutylphenyl)dodecane, 5-(ethylphenyl)dodecane, 6-(ethylphenyl)dodecane, 3,5-dimethyl-2-(dodecylphenyl)decane, 5-ethyl-3-(t-butylphenyl)decane, 4,6,8-trimethyl-2-(tolyl)nonane and 5-n-propyl-4-methyl-2-(diethylphenyl)octane.

Other specific examples are dodecyltoluene hydroperoxide, dodecylisopropylbenzene hydroperoxide, 4-(hydroperoxyisopropylphenyl)dodecane, 3-hydroperoxy-3-(tertiarybutylphenyl)dodecane, 2-hydroperoxy-2-(ethylphenyl)dodecane, 2-(diisopropylphenyl)-2-hydroperoxydodecane, dodecyltriisopropylbenzene hydroperoxide, dodecyl-(dimethyl)(tertiarybutyl)benzene hydroperoxide, and dodecyl(dimethyl)(isopropyl)benzene hydroperoxide.

We use the hydroperoxides discussed herein as oxidants in polymerization recipes at low polymerization temperatures, i.e. from about 10° C., or just above the freezing point of water, to well below the freezing point of water, such as —40° C. or lower. The recipe will also include a reductant compound or composition. In some recipes this will be a single compound, or a mixture of homologous compounds, such as hydrazine, ethylenediamine, diethylenetriamine, aminoethylethanolamine, ethylenemethylethylenetriamine, tetraethylenepentamine, and the like. These compounds have the general formula RHN(CHXCHXNH)$_m$(CHXCHX)$_n$NHR where each R contains not more than eight carbon atoms and is of the group consisting of hydrogen, aliphatic, cycloaliphatic, aromatic, olefinic, and cycloolefinic radicals, and each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and can be of mixed character when containing six or more carbon atoms, such as alkylcycloalkyl, aralkyl, alkaryl groups, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i.e., mercapto compounds and thioethers) and halogen compounds. In such recipes, such a polyamino compound appears to act as a reductant, and no other activating ingredients, such as compounds of polyvalent-multivalent metals, or reducing ingredients, such as a reducing sugar, need be present in order to obtain satisfactory and rapid polymerization of the monomeric material, even at sub-freezing temperatures. The amount of polyamino compound used to obtain optimum results also is dependent upon other ingredients in the recipe. Preferred results are usually obtained with between 0.02 to 5 parts by weight, per 100 parts of monomeric material, of the polyamino compound. In other recipes a composition is used which comprises one compound which is an oxidation catalyst, or activator, and another different compound which is a reductant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. The multivalent metal ion of the oxidation catalyst can easily and readily pass from a low valence state to a higher valence state, and vice versa. Sometimes this compound, when present in its lower valence state, can function in the dual role of reductant and oxidation catalyst. One commonly used oxidation catalyst is an iron pyrophosphate, and is separately made up in aqueous solution from a ferrous salt, such as ferrous sulfate, and a pyrophosphate of an alkali metal, such as sodium or potassium.

When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish-green precipitate. When preparing the activator the mixture is generally heated above 50° C., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 60° C. for a period of heating ranging from 10 to 30 minutes. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex, whatever its composition, is only slightly soluble in water and is one active form of ferrous ion and pyrophosphate which can be successfully used in our invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

The amounts of activator ingredients are usually expressed in terms of the monomer charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The mol ratio of ferrous salt to alkali metal pyrophosphate can be between 1:0.2 and 1:3.5, with a preferred ratio between 1:0.35 and 1:2.8.

In effecting emulsion polymerization of a monomeric material, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

As previously stated, it is usually desirable that the multivalent metal be present in its lower valence state. With some recipes, it is unnecessary to include an organic reducing agent either in the activator solution or in the polymerization mixture. However, particularly at temperatures above 0° C., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result the multivalent ion will be partially reduced and a substantial amount of the multivalent ion will be present in its lower valence state when the activator solution is ready for addition to the polymerization mixture.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene, (2-chloro-1,3-butadiene), bromoprene, methylchloroprene (2-chloro-3-methyl-1,3-butadiene), and the like; aryl olefins such as styrene, various alkyl styrenes, p-chloro styrene, p-methoxy-styrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copoloymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more partciularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 percent, or more, of the alcohol present be in the aqueous phase. A high-boiling alcohol such as glycerine is difficult to recover from the resulting serum; a low-boiling alcohol such as methanol is easily removed and frequently preferred. Other low-boiling alcohols such as ethanol, however, are frequently too soluble in the liquid monomeric material to permit satisfactory operation. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 98 percent of the monomeric material is polymerized.

It is one of the outstanding advantages of the use of the hydroperoxides, as disclosed herein, that it is feasible to produce "high solids" latices, i.e. latices resulting from the use of an amount of aqueous medium in the lower part of the range disclosed, i.e. a ratio of aqueous phase to monomeric material between 0.5:1 to 1:1 and an extent of conversion in the higher part of the range disclosed, i.e. from 70 percent conversion to complete conversion.

Emulsifying agents which are applicable in these low temperature polymerizations are materials such as potassium laurate, potassium oleate, and the like, and salts of rosin acids. Particularly useful are the specific mixtures of salts of fatty acids and of rosin acids, which seem to have a synergistic action when used with some of these same hydroperoxides, as more fully disclosed and claimed by Charles F. Fryling and Archie E. Follett in their application Serial No. 72,534, filed January 24, 1949, now abandoned in favor of its continuation-in-part application Serial No. 157,132, filed April 20, 1950, now Patent 2,686,165. However, other emulsifying agents, such as nonionic emulsifying agents, salts of alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase may be varied over a rather wide range without producing deleterious effects on the conversion rate or the properties of the polymer. In general the pH may be within the range of 9.0 to 12, with the narrower range of 9.5 to 10.5 being most generally preferred.

The mercaptans applicable in this invention are usually alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

The amount of hydroperoxymethane used to obtain an optimum reaction rate will depend upon the other reaction conditions, and particularly upon the type of polymerization recipe used. The amount is generally expressed in millimols per 100 parts of monomeric material, using in each instance the same units of weight throughout, i.e. when the monomeric material is measured in pounds the hydroperoxymethane is measured in millipound mols. The same is true for other ingredients of the polymerization recipe. An optimum rate of polymerization is usually obtained with the amount of hydroperoxymethane between 0.1 and 10 millimols per 100 parts by weight of monomeric material. The hydroperoxide can frequently be easily separated from accompanying materials by converting it to a corresponding salt of an alkali metal, which is usually a crystalline material in a pure or concentrated state at atmospheric temperatures, and separating the salt. This salt can be used as an active form of the hydroperoxide, since it is promptly converted to the hydroperoxide by hydrolysis when the salt is admixed with the aqueous medium of the polymerization reaction mixture.

Advantages of this invention are illustrated by the following examples. The reactants, and their proportions, and the other specific ingredients of the recipes are presented as being typical and should not be construed to limit the invention unduly. One of the interesting properties of those trisubstituted hydroperoxymethanes discussed herein in which the substituent groups are hydrocarbon radicals is their relatively high distribution coefficient ratio of hydroperoxide dissolved in hydrocarbon phase to hydroperoxide dissolved in the aqueous phase, and the influences of an emulsifying agent on this distribution, as contrasted with the distribution coefficient for such a material as cumene hydroperoxide.

The distribution of cumene hydroperoxide and of diisopropylbenzene hydroperoxide between the liquid phases of a typical polymerization recipe, with and without soap at $-10°$ C., was investigated (in the absence of the usual polymerization catalyst activator). It was first established that less than two hours was required to reach an equilibrium distribution. The peroxides were determined by the method of Wagner et al., Anal. Chem. 19, 976 (1948). The system employed was the following:

| | Parts by weight |
|---|---|
| Butadiene | 70 |
| Styrene | 30 |
| Water | 180 |
| Methanol | 40 |
| Cumene or diisopropylbenzene hydroperoxide | 0.20–0.21 |
| K-laurate (when used) | 5.0 |
| Temperature, $-10°$ C. | |

The liquid mixtures were agitated at $-10°$ C. for two hours and then allowed to stand at $-10°$ C. until phase separation was adequate. The following data were obtained upon analysis of the hydrocarbon and water phases:

| Hydroperoxide, Type | Parts | Soap | Percent Hydroperoxide In— | |
|---|---|---|---|---|
| | | | HC Phase | H₂O Phase |
| Cumene | 0.20 | None | 83 | 17 |
| Do | 0.20 | K laurate | 60 | 40 |
| Diisopropylbenzene | 0.21 | None | 90 | 10 |
| Do | 0.21 | K laurate | 79 | 21 |

The solubilization of hydroperoxides by soap is evident. With both hydroperoxides the solubility in the aqueous phase is more than doubled by the presence of soap. The greater solubility of cumene hydroperoxide in the aqueous phase, as compared with the solubility of diisopropylbenzene hydroperoxide, is also indicated by the data.

Additional distribution experiments were conducted at

5° C. in an alcohol-free system. The following results were obtained:

| Hydroperoxide, Type | Parts | Soap | Percent Hydroperoxide In— | |
|---|---|---|---|---|
| | | | HC Phase | H₂O Phase |
| Cumene | 0.20 | None | 90 | 10 |
| Do | 0.20 | K laurate | 61 | 39 |
| Diisopropylbenzene | 0.20 | None | 92 | 8 |
| Do | 0.20 | K laurate | 84 | 16 |

Example I

The copolymerization of butadiene and styrene was carried out at −10° C. using the following recipe:

| | Parts by weight |
|---|---|
| Butadiene | 70. |
| Styrene | 30. |
| Water | 192. |
| Methanol | 48. |
| Potassium laurate | 5.0. |
| Mercaptan blend [1] | 0.25. |
| Dimethyl - (isopropylphenyl)-hydroperoxy methane composition [2] | 0.15 (0.77 millimol). |
| Activator solution— | |
| Potassium chloride | 0.4. |
| Ferrous sulfate, $FeSO_4 \cdot 7H_2O$ | 0.2 (0.72 millimol). |
| Sodium pyrophosphate, $Na_4P_2O_7 \cdot 10H$ | 0.32 (0.72 millimol). |

[1] A blend of tertiary $C_{12}$, $C_{14}$, and $C_{16}$ aliphatic mercaptans in a ratio of 3 : 1 : 1 parts by weight.
[2] Calculation based on 100 percent diisopropylbenzene monohydroperoxide.

In preparing the dimethyl-(isopropylphenyl)-hydroperoxy-methane (or diisopropylbenzene hydroperoxide) composition, a mixture of 200 ml. of freshly-distilled m-diisopropylbenzene and 0.5 gm. of the sodium salt of cumene hydroperoxide was charged into a reactor provided with an efficient motor-driven stirrer. After the reactor was charged it was immersed in a constant temperature bath maintained at 140° C. Dry oxygen was then passed through the reactor and the reaction mixture was agitated vigorously. As the oxidation proceeded small samples were withdrawn periodically from the reactor and analyzed for hydroperoxide content. The oxidation was stopped after two hours when the reaction mixture reached an active oxygen content of 4.0 percent or a hydroperoxide content of 47.5 percent, calculated as the monohydroperoxide of m-diisopropylbenzene. The contents of the reactor were then withdrawn immediately, chilled to 0° C., placed in a suitable container, and stored at +5° C.

The oxidation mixture from this oxidation is made up of unreacted m-diisopropylbenzene, the monohydroperoxide of that hydrocarbon, and other oxygenated products. When this mixture was subjected to distillation at 1–2 mm. pressure and at room temperature, the volatile, non-hydroperoxidic constituents were removed as distillate. The still-pot residue recovered at the end of the distillation had an active oxygen content of 4.9 percent or a hydroperoxide content of 58.9 percent, calculated as the monohydroperoxide of m-diisopropylbenzene.

Preparation of the activator composition was effected by dissolving the ferrous sulfate, sodium pyrophosphate, and potassium chloride in the requisite quantity of water and heating the resulting mixture at 60° C. for 40 minutes. Concentrations of ingredients were adjusted in such a way that 25 ml. of the activator solution was used per 100 grams of monomers charged.

Polymerization was carried out according to the conventional procedure. A conversion of 60 percent was reached in 6 hours.

Example II

The recipe of Example I was followed except that the emulsifier employed was potassium tetrahydroabietate. Two runs were made at −10° C., one using 0.15 part diisopropylbenzene hydroperoxide (0.77 millimol) as the oxidant and the other using 0.12 part cumene hydroperoxide, (0.78 millimol). In the run using diisopropylbenzene hydroperoxide a 60 percent conversion was reached in 7.8 hours while in the run in which cumene hydroperoxide was employed, 12.3 hours was required before a 60 percent conversion was obtained.

Example III

The following recipe was employed for carrying out a series of butadiene/styrene copolymerizations:

| | Parts by weight |
|---|---|
| Butadiene | 72. |
| Styrene | 28. |
| Water, total | 180. |
| Rosin soap, potassium salt, pH 10 (Dresinate 214) | 4.7. |
| Mercaptan blend [1] | 0.25. |
| Diisopropylbenzene hydroperoxide composition [1] | Variable. |
| Potassium hydroxide | 0.037. |
| Potassium chloride | 0.5. |
| Dextrose | 1.0. |
| Activator solution— | |
| Potassium pyrophosphate, $K_4P_2O_7$ | 0.165 (0.50 millimol). |
| Ferrous sulfate, $FeSO_4.7H_2O$ | 0.14 (0.50 millimol). |
| Water to make 10 ml. of solution. | |

[1] See Example I.

The activator composition was prepared by heating a mixture of the ferrous sulfate, potassium pyrophosphate, and water at 60° C. for 20 minutes.

The dextrose, potassium hydroxide, and 25 parts water were heated at 70° C. for 25 minutes and added to the soap solution. The remaining ingredients were charged in the conventional manner. Polymerization was effected at 5° C. The time-conversion data are recorded below together with the amounts of the hydroperoxide employed.

| Run | Mols hydroperoxide per mol $Fe^{++}$ | Hydroperoxide | | Conversion, Percent | | |
|---|---|---|---|---|---|---|
| | | Parts | Millimols | 2 Hours | 7 Hours | 12 Hours |
| 1 | 0.375 | 0.037 | 0.19 | 13.0 | 15 | 16 |
| 2 | 0.75 | 0.073 | 0.38 | 7.4 | 55.8 | 87 |
| 3 | 1.0 | 0.098 | 0.50 | 4.1 | 43.8 | 83.5 |
| 4 | 1.5 | 0.147 | 0.75 | 3.1 | 32.5 | 74 |
| 5 | 2.0 | 0.195 | 1.0 | 2.1 | 23.5 | 63 |
| 6 | 3.0 | 0.293 | 1.5 | | 15 | 49.5 |
| 7 [1] | [1] 1.3 | [1] 0.1 | [1] 0.66 | 9.0 | 35.5 | 64.5 |

[1] Run 7 was made with 0.1 part cumene hydroperoxide (100 percent) substituted for the diisopropylbenzene hydroperoxide composition.

Example IV

The recipe of Example I was followed except that the emulsifying agent employed was the potassium salt of hydrogenated tallow acid. Specifications for this soap are as follows:

| | |
|---|---|
| Iodine No. | 52 maximum |
| Iodine No. minus thiocyanogen No. | Not to exceed 6 |
| Saturated acid below $C_{12}$ | 1.0% maximum |
| Unsaturated acid above $C_{18}$ | 2.0% maximum |
| Saturated acid above $C_{18}$ | 5.0% maximum |

Two runs were made at −10° C., the first one using 0.15 part diisopropylbenzene hydroperoxide (0.77 millimol) and the second employing 0.12 part cumene hydroperoxide (0.78 millimol). In the first run a 60 percent conversion was reached in 4.6 hours while in the second case a 12-hour reaction period was required to reach the same conversion.

Example V

A series of butadiene-styrene copolymerizations was carried out using variable amounts of diisopropylbenzene hydroperoxide as the oxidant. The following recipe was employed:

| | Parts by weight |
|---|---|
| Butadiene | 72. |
| Styrene | 28. |
| Water | 180. |
| Alkyl aryl sulfonate [1] | 5.0. |
| Mercaptan blend [2] | 0.24. |
| Hydroperoxide | Variable. |
| Ferrous sulfate, $FeSO_4 \cdot 7H_2O$ | 0.08 (0.29 millimol). |
| Potassium pyrophosphate, $K_4P_2O_7$ | 0.101 (0.31 millimol). |
| Dextrose | 1.00. |
| Potassium hydroxide | 0.03. |

[1] *Santomerse #1.*—The commercial product was treated with isopropanol and the resulting slurry heated to 74° C. It was then cooled to 16° C. and filtered to remove any inorganic salts present. The product obtained was extracted with pentane to remove the unsulfonated material and then dried.
[2] See Example I.

A mixture of 5.0 grams of dextrose and 5.0 ml. of 3 percent potassium hydroxide was made up to 50 ml. with water and digested 11 minutes at 70° C. The requisite quantity of this mixture was then employed in the polymerization recipe.

The activator solution was prepared by dissolving 1.77 gm. potassium pyrophosphate ($K_4P_2O_7$) in approximately 50 ml. water and adding it to 1.40 gm. ferrous sulfate ($FeSO_4 \cdot 7H_2O$) dissolved in approximately 50 ml. water. The mixture was made up to 100 ml. and heated 23 minutes at 60° C.

The emulsifier, water, dextrose solution, and activator were charged to the reactor in the order named after which the mercaptan dissolved in styrene was added. The butadiene was then introduced, the temperature adjusted to 5° C., and the hydroperoxide added. Polymerization was effected at 5° C. using the conventional technique. Results obtained after a 13-hour reaction period in runs containing different amounts of diisopropylbenzene hydroperoxide are shown below together with a control run in which 0.10 part cumene hydroperoxide was substituted for the diisopropylbenzene hydroperoxide.

| Hydroperoxide | Parts | Millimol | Conversion, Percent, 13 Hours |
|---|---|---|---|
| Diisopropylbenzene | 0.10 | 0.51 | 82.7 |
| Do | 0.08 | 0.41 | 87.1 |
| Do | 0.06 | 0.31 | 87.9 |
| Do | 0.04 | 0.21 | 87.4 |
| Cumene | 0.10 | 0.66 | 60.8 |

Example VI

Two polymerization runs were carried out at 5° C. using the recipe and procedure of Example V except that variable amounts of ferrous sulfate, potassium pyrophosphate, and hydroperoxide were used. A control run was also made in which cumene hydroperoxide was employed as the oxidant. The data are herewith presented.

| Hydroperoxide | Parts | Millimol | $FeSO_4 \cdot 7H_2O$ Parts | Millimol | $K_4P_2O_7$ Parts | Millimol | Conversion, Percent, 13 Hours |
|---|---|---|---|---|---|---|---|
| Diisopropylbenzene | 0.04 | 0.21 | 0.08 | 0.29 | 0.101 | 0.31 | 83.9 |
| Do | 0.04 | 0.21 | 0.05 | 0.18 | 0.063 | 0.19 | 76.1 |
| Cumene | 0.10 | 0.66 | 0.08 | 0.29 | 0.101 | 0.31 | 57.9 |

Example VII

A series of polymerization runs was carried out at 5° C. using the two hydroperoxides, cumene and diisopropylbenzene, as oxidants and potassium soaps of various commercially available organic acids as emulsifying agents. The following recipe was employed.

| | Parts by weight |
|---|---|
| Butadiene | 70. |
| Styrene | 30. |
| Water | 170. |
| Emulsifier | 5. |
| Mercaptan blend [1] | 0.25. |
| Hydroperoxide | (See below.) |
| Activator | 10. |
| $FeSO_4 \cdot 7H_2O$ | 0.14 (0.50 millimol). |
| $K_4P_2O_7$ | 0.165 (0.50 millimol). |

[1] See Example I.

Potassium soaps were prepared from the following commercially available materials.

(1) *Neofat D-242.*—A hydrogenated oleic acid-rosin acid mixture.
(2) *Neofat S-142.*—Refined hydrogenated tall oil containing a high percentage of rosin acid.
(3) *Indusoil.*—A mixture containing 55–60 percent fatty acids, 34–38 percent rosin acids, and 6–10% sterols, higher alcohols, etc.
(4) *Stabelite-742.*—Hydrogenated rosin.
(5) *Rosin-731 acid.*—Disproportionated rosin acid.
(6) *Tallex.*—Commercial grade of abietic acid crystals.

Two polymerization runs were made with each emulsifying agent, one in which 0.11 part diisopropylbenzene hydroperoxide (0.57 millimol) was used as the oxidant and one in which 0.08 part cumene hydroperoxide (0.53 millimol) was used. The results are tabulated below:

| Acid Employed for Preparation of K Soap | Hydroperoxide | Conversion, Percent, 12–12.5 Hours |
|---|---|---|
| Neofat D-242 | Diisopropylbenzene | 23.1 |
| | Cumene | 8.6 |
| Neofat S-142 | Diisopropylbenzene | 58.8 |
| | Cumene | 36.2 |
| Indusoil | Diisopropylbenzene | 26.4 |
| | Cumene | 13.7 |
| Stabelite-742 | Diisopropylbenzene | 57.5 |
| | Cumene | 36.3 |
| Rosin-731 acid | Diisopropylbenzene | 90.5 |
| | Cumene | 62.0 |
| Tallex | Diisopropylbenzene | 18.2 |
| | Cumene | 3.8 |

The superiority of diisopropylbenzene hydroperoxide in all cases is clearly demonstrated, and is shown to be very marked in several cases.

Example VIII

The recipe of Example III was followed for carrying out a series of polymerization runs except that triisopropylbenzene hydroperoxide was used as the oxidant. This material was prepared by the oxidation of triisopropylbenzene at 100° C. in the presence of an initiator comprising 1.0 part of the potassium salt of diisopropylbenzene hydroperoxide per 100 parts of the hydrocarbon to be oxidized. The reaction was continued for a period of 3.25 hours. The concentration of hydroperoxide in the reaction mixture was 24.6 percent. Polymerization was effected at 5° C. using the same procedure as that given in Example III. In three runs the amount of the hydroperoxide was varied from 0.088 to 0.177 part (0.37 to 0.75 millimol) per 100 parts monomers. The amounts of the other ingredients were held constant. A control run using 0.1 part (0.66 millimol) cumene hydroperoxide was also made. The following tabulation shows the results obtained.

| FeSO₄·7H₂O, Parts | Hydroperoxide | Parts | Millimols | Mols Peroxide/Mols Fe++ | Conversion, percent | | |
|---|---|---|---|---|---|---|---|
| | | | | | 2-hr. | 7-hr. | 12-hr. |
| 0.14 | Triisopropyl benzene. | 0.088 | 0.37 | 0.75 | 3.2 | 34.4 | 68.6 |
| 0.14 | ____do____ | 0.118 | 0.50 | 1.0 | 4.5 | 41.0 | 76.4 |
| 0.14 | ____do____ | 0.177 | 0.75 | 1.5 | 13.5 | 66.8 | 90.5 |
| 0.14 | Cumene | 0.10 | 0.66 | 1.3 | 10.7 | 32.8 | 65.8 |

*Example IX*

The recipe of Example III was followed for carrying out a series of polymerization runs except that tert-butylisopropylbenzene hydroperoxide was used as the oxidant. The preparation of tert-butylisopropylbenzene hydroperoxide was affected by the oxidation of tert-butylisopropylbenzene at 125° C. using as an initiator 0.46 part of the potassium salt of diisopropylbenzene hydroperoxide per 100 parts of the hydrocarbon to be oxidized. The reaction was allowed to proceed 5 hours at which time the concentration of hydroperoxide in the mixture was 16.05 percent. Polymerization was effected at 5° C. using the same procedure as that given in Example III. In four runs the amount of the hydroperoxide was varied from 0.078 to 0.208 part while the quantities of the other ingredients were held constant. A control run using 0.1 part cumene hydroperoxide was also made. The following tabulation shows the results obtained.

| FeSO₄·7H₂O, Parts | Hydroperoxide | Parts | Millimols | Mols Peroxide/Mols Fe++ | Conversion, percent | | |
|---|---|---|---|---|---|---|---|
| | | | | | 2-hr. | 4.5-hr. | 7-hr. |
| 0.14 | Tert-butyl-isopropylbenzene. | 0.078 | 0.37 | 0.75 | 17.4 | 39.3 | 52.0 |
| 0.14 | ____do____ | 0.104 | 0.50 | 1.0 | 22.1 | 47.0 | 71.8 |
| 0.14 | ____do____ | 0.156 | 0.75 | 1.5 | 18.0 | 38.8 | 61.7 |
| 0.14 | ____do____ | 0.208 | 1.00 | 2.0 | 18.3 | 40.0 | 64.6 |
| 0.14 | Cumene | 0.10 | 0.66 | 1.3 | 9.5 | 22.1 | 37.8 |

*Example X*

The recipe of Example III was followed for carrying out a series of polymerization runs except that dodecylisopropylbenzene hydroperoxide was used as the oxidant. This hydroperoxide was prepared by the oxidation of dodecylisopropylbenzene, which had been previously prepared by the alkylation of isopropylbenzene with 1-dodecene. This dodecylisopropylbenzene was oxidized at 130° C. to form dodecylisopropylbenzene hydroperoxide. As an initiator 0.9 part of the potassium salt of diisopropylbenzene hydroperoxide per 100 parts of the hydrocarbon to be oxidized was employed. After a six-hour reaction period the concentration of peroxide in the reaction mixture was 21.9 percent. Polymerization was effected at 5° C. using the same procedure as that given in Example III. In four runs the amount of the hydroperoxide was varied from 0.12 to 0.32 part while the quantities of the other ingredients were held constant. A control run was also made. The following tabulation shows the results obtained:

| FeSO₄·7H₂O, Parts | Hydroperoxide | Parts | Millimols | Mols Peroxide/Mols Fe++ | Conversion, percent | | |
|---|---|---|---|---|---|---|---|
| | | | | | 2-hr. | 4.5-hr. | 7-hr. |
| 0.14 | Dodecylisopropylbenzene. | 0.12 | 0.37 | 0.75 | 2.5 | 2.7 | 3.5 |
| 0.14 | ____do____ | 0.16 | 0.50 | 1.0 | 6.2 | 10.0 | 15.8 |
| 0.14 | ____do____ | 0.24 | 0.75 | 1.5 | 14.2 | 27.3 | 46.4 |
| 0.14 | ____do____ | 0.32 | 1.00 | 2.0 | 17.1 | 36.4 | 61.0 |
| 0.14 | Cumene | 0.10 | 0.66 | 1.3 | 9.5 | 22.1 | 37.8 |

*Example XI*

Para-methylisopropylbenzene hydroperoxide was prepared by the oxidation of p-methylisopropylbenzene at a temperature of 126° C. using as an initiator one part of the potassium salt of diisopropylbenzene hydroperoxide per 100 parts of the hydrocarbon to be oxidized. The reaction was allowed to proceed for 5.5 hours at which time the concentration of hydroperoxide in the reaction mixture was 14.1 percent.

The recipe of Example III was followed for carrying out a series of polymerization runs except that p-methylisopropylbenzene hydroperoxide was used as the oxidant. Polymerization was effected at 5° C. using the same procedure as that given in Example III. In four runs the amount of hydroperoxide was varied from 0.062 to 0.250 part while the quantities of the other ingredients were held constant. A control run using 0.1 part cumene hydroperoxide was also made. The following tabulation shows the results obtained:

| FeSO₄·7H₂O | | Hydroperoxide | | | Mol. Ratio, Hydroperoxide to Fe++ | Conversion, Percent | | |
|---|---|---|---|---|---|---|---|---|
| Parts | Millimols | Type | Parts | Millimols | | 2-Hr. | 5-Hr. | 7-Hr. |
| 0.14 | 0.50 | p-methylisopropylbenzene. | 0.062 | 0.37 | 0.75 | 11.8 | 39.0 | 52.0 |
| 0.14 | 0.50 | ____do____ | 0.083 | 0.50 | 1.0 | 5.2 | 23.2 | 38.7 |
| 0.14 | 0.50 | ____do____ | 0.166 | 1.00 | 2.0 | 6.7 | 25.2 | 41.2 |
| 0.14 | 0.50 | p-methylisopropylbenzene. | 0.250 | 1.50 | 3.0 | 3.6 | 17.0 | 42.3 |
| 0.14 | 0.50 | Cumene | 0.10 | 0.66 | 1.3 | 7.8 | 24.5 | 36.0 |

Example XII

Meta-methylisopropylbenzene hydroperoxide (dimethyl-(2-methylphenyl)-hydroperoxymethane) was prepared by the oxidation of methylisopropylbenzene containing 60 to 70 percent of the meta compound, 25 to 30 percent of the para compound and 4 to 7 percent of the ortho compound. Since the meta-compound predominates, the oxidation product is so designated. Oxidation was effected at 126° C. using as an initiator 0.9 part of the potassium salt of diisopropylbenzene hydroperoxide per 100 parts of the hydrocarbon to be treated. The reaction was allowed to proceed 8.75 hours at which time the concentration of hydroperoxide in the reaction mixture was 14.1 percent.

The recipe of Example III was followed for carrying out a series of polymerization runs except that m-methylisopropylbenzene hydroperoxide was used as the oxidant. Polymerization was effected at 5° C. using the same procedure as that given in Example III. In four runs the amount of hydroperoxide was varied from 0.062 to 0.250 part while the quantities of the other ingredients were held constant. A control run using 0.1 part cumene hydroperoxide was also made. The results are herewith presented.

| $FeSO_4.7H_2O$ | | Hydroperoxide | | | Mol. Ratio, Hydroperoxide to $Fe^{++}$ | Conversion, Percent | | |
|---|---|---|---|---|---|---|---|---|
| Parts | Millimols | Type | Parts | Millimols | | 2-Hr. | 5-Hr. | 7-Hr. |
| 0.14 | 0.50 | m-methylisopropylbenzene. | 0.062 | 0.37 | 0.75 | 10.2 | 29.8 | 48.0 |
| 0.14 | 0.50 | ----do---- | 0.083 | 0.50 | 1.0 | 5.1 | 21.2 | 35.4 |
| 0.14 | 0.50 | ----do---- | 0.166 | 1.00 | 2.0 | 9.8 | 28.2 | 45.6 |
| 0.14 | 0.50 | ----do---- | 0.250 | 1.50 | 3.0 | 6.8 | 25.4 | 39.0 |
| 0.14 | 0.50 | Cumene | 0.10 | 0.66 | 1.3 | 7.8 | 24.5 | 36.0 |

Example XIII

Dodecyltoluene hydroperoxide (methyl-decyl-(methylphenyl)-hydroperoxymethane) was prepared by the oxidation of dodecyltoluene which had been previously prepared by the alkylation of toluene with 1-dodecene. Oxidation was effected at 140° C. using as an initiator 0.5 part of the potassium salt of diisopropylbenzene hydroperoxide per 100 parts of the hydrocarbon to be treated. The reaction was continued for 7 hours at which time the concentration of the hydroperoxide in the reaction mixture was 7.5 percent.

The recipe of Example III was followed for carrying out a series of polymerization runs except that dodecyltoluene hydroperoxide was used as the oxidant. Polymerization was effected at 5° C. using the same procedure as that given in Example III. In four runs the amount of hydroperoxide was varied from 0.11 to 0.511 part while the quantities of the other ingredients were held constant. A control run using 0.1 part cumene hydroperoxide was also made. The data are herewith presented.

| $FeSO_4.7H_2O$ | | Hydroperoxide | | | Mol Ratio, Hydroperoxide to $Fe^{++}$ | Conversion, Percent | | |
|---|---|---|---|---|---|---|---|---|
| Parts | Millimols | Type | Parts | Millimols | | 2-Hr. | 5-Hr. | 7-Hr. |
| 0.14 | 0.50 | dodecyltoluene | 0.11 | 0.37 | 0.75 | 5.9 | 25.0 | 37.4 |
| 0.14 | 0.50 | ----do---- | 0.22 | 0.75 | 1.5 | 13.0 | 47.2 | 67.8 |
| 0.14 | 0.50 | ----do---- | 0.365 | 1.25 | 2.5 | 12.6 | 46.0 | 71.2 |
| 0.14 | 0.50 | ----do---- | 0.511 | 1.75 | 3.5 | 0.6 | 18.8 | 34.4 |
| 0.14 | 0.50 | cumene | 0.10 | 0.66 | 1.3 | 7.8 | 24.5 | 36.0 |

Example XIV

In several of the foregoing examples, comparisons were made between various concentrations of some specific trisubstituted hydroperoxymethanes having ten or more carbon atoms per molecule and one fixed concentration of cumene hydroperoxide. This particular concentration is one of the most favorable, as is shown by the following data. The recipe of Example III was used, at 5° C., with varying amounts of cumene hydroperoxide in place of the diisopropylbenzene hydroperoxide composition of that example. These runs were made at a different time, which accounts for the slight difference in results.

| Cumene Hydroperoxide | | Mol Ratio, Hydroperoxide to $Fe^{++}$ | Conversion, Percent | | | | |
|---|---|---|---|---|---|---|---|
| Parts | Millimols | | 2 Hrs. | 5 Hrs. | 7 Hrs. | 12 Hrs. | 24 Hrs. |
| 0.038 | 0.25 | .5 | 11.6 | 28.8 | 42.6 | 62.4 | 71.4 |
| 0.057 | 0.375 | .75 | 11.2 | 29.2 | 40.4 | 69.0 | 89.0 |
| 0.076 | 0.50 | 1.0 | 9.9 | 27.8 | 40.7 | 69.9 | 93.6 |
| 0.10 | 0.66 | 1.3 | 9.8 | 25.3 | 38.7 | 69.3 | 93.2 |
| 0.15 | 0.99 | 2.0 | 9.4 | 24.0 | 36.0 | 67.7 | 93.5 |

It is interesting to note that, in this specific recipe, there is little variation of conversion with the relative amount of cumene hydroperoxide over an appreciable range. In contrast, not only does the use of other hydroperoxides give faster rates, but the rates show a more defined variation with the relative amount of hydroperoxide.

Example XV

A series of runs was made in which different hydroperoxides were employed as oxidants in the following polymerization recipe:

| | Parts by weight |
|---|---|
| Butadiene | 70. |
| Styrene | 30. |
| Water, total | 180. |
| Soap flakes | 5.0. |
| Potassium chloride | 0.4. |
| Mercaptan blend [1] | 0.1. |
| Oxidant | (2.27 millimol). |
| Tetraethylenepentamine | 1.5. |

[1] See Example I.

A mixture of the emulsifying agent, water, and potassium chloride was prepared and potassium hydroxide added to adjust the pH to 10.3. A solution of the hydroperoxide and mercaptan in styrene was then introduced followed by the butadiene. The reactor was pressured to 30 pounds per square inch gauge with nitrogen and the temperature adjusted to 5° C. Sufficient water was added to the tetraethylenepentamine to make a solution and this mixture was then charged to the reactor. Polymerization was effected in the conventional manner while the temperature was held at 5° C. A control run was also made using cumene hydroperoxide as the oxidant. Results from the various runs are tabulated below.

| Oxidant | Conversion, Percent | |
|---|---|---|
| | 2.5 Hours | 13.7 Hours |
| Diisopropylbenzene hydroperoxide | 43 | 100 |
| Triisopropylbenzene hydroperoxide | 66 | |
| Tert-butylisopropylbenzene hydroperoxide | 66 | |
| Dodecylisopropylbenzene hydroperoxide | 25 | 98 |
| Cumene hydroperoxide (control) | 33 | 92 |

*Example XVI*

A series of polymerizations was carried out at −10° C. using different emulsifiers in the following tert-butylisopropylbenzene hydroperoxide-tetraethylenepentamine recipe:

| | Parts by weight |
|---|---|
| Butadiene | 70. |
| Styrene | 30. |
| Water, total | 192. |
| Methanol | 48. |
| Potassium chloride | 0.4. |
| Emulsifier | 5.0. |
| Mercaptan blend [1] | 0.1. |
| Tert-butylisopropylbenzene hydroperoxide | 0.472 (2.27 millimols). |
| Tetraethylenepentamine | 0.275 (1.5 millimols). |

[1] See Example I.

A mixture of the emulsifying agent, water, methanol, and potassium chloride was prepared and potassium hydroxide added to adjust the pH to the desired level. To this mixture a solution of the hydroperoxide and mercaptan in the styrene was added in such a way that two layers were formed. The materials thus prepared were aged over night at 0° C. Subsequent to the aging period the mixture was warmed to room temperature, butadiene was added, and the reactor was pressured to 30 pounds per square inch gauge with nitrogen. The temperature was then adjusted to −10° C. Sufficient water was added to the tetraethylenepentamine to make a solution and this mixture was then charged to the reactor. Polymerization was carried out in the conventional manner with the temperature being held at −10° C. The results are herewith presented:

| Emulsifier | Parts | pH of Soap Solution | Conversion, Percent | | | |
|---|---|---|---|---|---|---|
| | | | 2 Hrs. | 4 Hrs. | 7 Hrs. | 24 Hrs. |
| Rosin soap, K salt [1] | 5.0 | 10.25 | 0 | 1 | 2 | 9 |
| Rosin soap [2] | 3.5 | 10.4 | 8 | 18 | 32 | 86 |
| Soap flakes [2] | 1.5 | | | | | |
| Soap flakes [3] | 5.0 | 10.1 | 7 | 13 | 19 | 52 |
| K laurate | 5.0 | 11.0 | 17 | 32 | 54 | 96 |
| K laurate | 2.5 | 11.6 | 24 | 43 | 69 | 98 |
| K myristate | 2.5 | | | | | |

[1] Dresinate 214.
[2] Dresinate 214/K-SF flakes.
[3] K-SF flakes.

*Example XVII*

A series of polymerization runs was made at −10° C. to study the effect of varying the pH in the following recipe:

| | Parts by weight |
|---|---|
| Butadiene | 70. |
| Styrene | 30. |
| Water | 192. |
| Methanol | 48. |
| Rosin soap | 3.5. |
| Fatty acid soap [1] | 1.5. |
| Mercaptan blend [2] | 0.25. |
| Tert-butylisopropylbenzene hydroperoxide | 0.416 (2 millimols). |
| Tetraethylenepentamine | 1.50. |
| Potassium chloride | 0.25. |
| Potassium hydroxide | Variable. |

[1] Dresinate 214/K-SF flakes.
[2] See Example I.

The pH, the quantity of 1.04 N potassium hydroxide added, and the time-conversion data are shown below. A control run was made using cumene hydroperoxide in place of tert-butylisopropylbenzene hydroperoxide and these data are also presented.

| pH of Soap Solution | Ml. 1.04 N KOH/100 g. monomers | Conversion, Percent | | |
|---|---|---|---|---|
| | | 4.0 hrs. | 7.0 hrs. | 24.0 hrs. |
| 9.2 | 0.00 | 15 | 27 | 78 |
| 9.5 | 0.50 | 18 | 32 | 82 |
| 10.05 | 1.00 | 21 | 36 | 88 |
| 10.6 | 1.25 | 22 | 37 | 89 |
| 11.1 | 1.75 | 21 | 38 | 92 |
| 11.4 | 2.50 | 31 | 53 | 82 |
| 11.95 | 4.25 | 37 | 58 | 91 |
| 11.4 (CHP [1] Control) | 2.50 | 6 | 11 | 47 |

[1] Cumene hydroperoxide.

*Example XVIII*

The hydroperoxide to tetraethylenepentamine ratio was varied in a series of polymerization runs made at −10° C. using the recipe of Example XVII. The following results were obtained:

| Tert-butylisopropylbenzene Hydroperoxide | | Tetraethylenepentamine | | Mol Ratio, Hydroperoxide/amine | Conversion, Percent | | |
|---|---|---|---|---|---|---|---|
| Parts | Millimols | Parts | Millimols | | 4 hrs. | 7 hrs. | 24 hrs. |
| 0.624 | 3.0 | 0.5 | 2.64 | 1.14:1.0 | 34 | 57 | 79 |
| 0.520 | 2.5 | 1.0 | 5.30 | 0.47:1.0 | 37 | 62 | 90 |
| 0.416 | 2.0 | 1.5 | 7.95 | 0.25:1.0 | 37 | 60 | 75 |
| 0.312 | 1.5 | 2.0 | 10.55 | 0.14:1.0 | 35 | 49 | 52 |
| 0.208 | 1.0 | 2.5 | 13.20 | 0.076:1.0 | 30 | 38 | 42 |
| 0.104 | 0.5 | 3.0 | 15.80 | 0.063:1.0 | 21 | 23 | 23 |

Example XIX

Several ethylene amino compounds were employed as activators in the following polymerization recipe:

| | Parts by weight |
|---|---|
| Butadiene | 70. |
| Styrene | 30. |
| Water | 180. |
| Soap flakes [1] | 5.0. |
| Potassium chloride | 0.4. |
| Mercaptan blend [2] | 0.1. |
| Tert-butylisopropylbenzene hydroperoxide | 0.416 (2.0 millimols). |
| Activating compound | (4.0 millimols). |

[1] K–SF flakes.
[2] See Example I.

The procedure of Example XV was followed with the temperature of polymerization being held at 5° C. The following results were obtained:

| Amino Compound | Conversion, Percent | | |
|---|---|---|---|
| | 3.5 Hrs. | 7 Hrs. | 24 Hrs. |
| Ethylenediamine | 5 | 7 | 60 |
| Diethylenetriamine | 15 | 28 | 76 |
| Triethylenetetramine | 48 | 73 | 96 |
| Tetraethylenepentamine | 80 | | |

Example XX

A polymerization run was made using the recipe of Example XIX, except that sec-propylenediamine (1,2-diaminopropane) was employed as the activator. The following time-conversion data were obtained:

| Time, hours: | Conversion, percent |
|---|---|
| 3.5 | 3 |
| 7 | 8 |
| 24 | 54 |

Example XXI

Aminoethylethanolamine was used as the activator in the polymerization recipe of Example XIX. A conversion of 60 percent was reached in 24 hours.

Example XXII

The recipe of Example XIX was employed when carrying out a polymerization reaction at 5° C. using hydrazine, added as hydrazine hydrate, as the activator. A conversion of 16 percent was reached in 24 hours.

Example XXIII

A series of polymerization runs was carried out at −10° C. using the following recipe:

| | Parts by weight |
|---|---|
| Butadiene | 70 |
| Styrene | 30 |
| Water | 192 |
| Methanol | 48 |
| Rosin soap [1] | 3.5 |
| Fatty acid soap [2] | 1.5 |
| Mercaptan blend [3] | 0.25 |
| Triisopropylbenzene hydroperoxide | Variable |
| Tetraethylenepentamine | Variable |
| Potassium chloride | 0.25 |

[1] Dresinate 214.
[2] K–SF flakes.
[3] See Example I.

In all runs the millimol ratio of hydroperoxide to amine was 0.5:1 but the initiator level was varied. The following results were obtained:

| Hydroperoxide, Parts | Amine, Parts | Millimol Level Hydroperoxide | Conversion, Percent | | | Time to 60% Conversion, Hours |
|---|---|---|---|---|---|---|
| | | | 4.0 Hrs. | 6.5 Hrs. | 24.0 Hrs. | |
| 0.06 | 0.095 | 0.25 | 12 | 24 | 70 | 15.0 |
| 0.12 | 0.19 | 0.50 | 17 | 33 | 77 | 12.2 |
| 0.18 | 0.28 | 0.75 | 24 | 42 | 81 | 10.0 |
| 0.24 | 0.38 | 1.00 | 28 | 49 | 87 | 8.2 |
| 0.31 | 0.47 | 1.25 | 33 | 54 | 91 | 7.2 |
| 0.35 | 0.57 | 1.50 | 33 | 56 | 92 | 6.8 |
| 0.47 | 0.76 | 2.0 | 36 | 58 | 94 | 6.5 |
| 0.59 | 0.95 | 2.5 | 37 | 60 | 94 | 6.4 |

Example XXIV

The following recipe was employed for carrying out the copolymerization of butadiene with styrene at 5° C.

| | Parts by weight |
|---|---|
| Butadiene | 70 |
| Styrene | 30 |
| Water | 75 |
| Fatty acid soap [1] | 0.5 |
| Sodium alkyltoluene sulfonate | 1.0 |
| Rosin soap, potassium salt [2] | 1.5 |
| Sodium salt of condensed alkyl aryl sulfonic acid [3] | 0.25 |
| Mercaptan blend [4] | 0.4 |
| Diisopropylbenzene hydroperoxide (100%) | 0.15 |
| Potassium chloride | 0.5 |
| Potassium hydroxide | 0.05 |
| Activator composition— | |
| $FeSO_4 \cdot 7H_2O$ | 0.14 |
| $K_4P_2O_7$ | 0.177 |
| Dextrose | 1.0 |
| Booster solution— | |
| Water | 5 |
| Potassium chloride | 0.1 |
| Potassium hydroxide | 0.06 |

[1] Potassium Office Rubber Reserve soap.
[2] Dresinate 214.
[3] Daxad–11.
[4] See Example I.

For the preparation of the activator composition, the dextrose and potassium pyrophosphate were first dissolved in 10 parts water and the mixture then heated to 95–99° C. and held at this temperature for 10 minutes. The solution was cooled to 60° C., the solid ferrous sulfate added, and the mixture cooled to room temperature before being charged to the reactor.

The emulsifiers, Daxad–11, potassium hydroxide, and potassium chloride, together with 65 parts water, were charged to the reactor. The pH of this charge was 11.3. The mercaptan dissolved in the styrene was then introduced followed by the butadiene. After cooling this mixture to 5° C., the activator composition was added and finally the hydroperoxide. After polymerization had continued for seven hours, the booster solution containing water, potassium chloride, and potassium hydroxide was added. A 54.7 percent solids latex was obtained in 36.4 hours and the latex was fluid. At this point the conversion reached was 96.2 percent.

Example XXV

The copolymerization of butadiene with styrene was effected at 5° C. according to the following recipe:

| | Parts by weight |
|---|---|
| Butadiene | 70 |
| Styrene | 30 |
| Water | 70 |
| Fatty acid soap [1] | 2.5 |
| Daxad–11 [1] | 0.5 |
| Mercaptan blend [1] | 0.4 |

| | Parts by weight |
|---|---|
| Diisopropylbenzene hydroperoxide (100%) | 0.125 |
| Potassium chloride | 0.6 |
| Potassium hydroxide | 0.05 |
| Activator composition— | |
| $FeSO_4 \cdot 7H_2O$ | 0.14 |
| $K_4P_2O_7$ | 0.177 |
| Dextrose | 1.0 |

[1] As in Example XXIV.

The same charging procedure as that given in the preceding example was employed, all ingredients being introduced initially. A 52 percent solids latex was obtained in 27 hours.

*Example XXVI*

A high solids latex was prepared at 5° C. using the following polymerization recipe:

| | Parts by weight |
|---|---|
| Butadiene | 70 |
| Styrene | 30 |
| Water | 70 |
| Soap flakes [1] | 2.5 |
| Mercaptan blend [1] | 0.30 |
| Tert-butylisopropylbenzene hydroperoxide | 0.188 |
| Daxad–11 [1] | 0.50 |
| Potassium chloride | 0.80 |
| Potassium hydroxide | 0.05 |
| Activator composition— | |
| $FeSO_4 \cdot 7H_2O$ | 0.21 |
| $K_4P_2O_7$ | 0.266 |

[1] As in Example XXIV.

The activator composition was prepared as follows: the ferrous sulfate was dissolved in 6 parts of water and the potassium pyrophosphate added. The mixture was diluted with 4 parts water, heated to 60° C., and cooled to room temperature before being used.

The charging procedure given in Example XXIV was employed with all ingredients being added initially. A latex containing 53 percent solids was obtained in 25.5 hours.

An additional run was made in which the activator level was reduced to 0.5 millimol (0.14 part $FeSO_4 \cdot 7H_2O$ and 0.177 part $K_4P_2O_7$). A latex containing 54.2 percent solids was obtained in a reaction period of 32.6 hours.

*Example XXVII*

The following recipe was employed for the production of a high solids latex at 5° C.

| | Parts by weight |
|---|---|
| Butadiene | 70 |
| Styrene | 30 |
| Water | 70 |
| Soap flakes [1] | 2.5 |
| Daxad–11 [1] | 0.5 |
| Mercaptan blend [1] | 0.3 |
| Potassium chloride | 0.8 |
| Potassium hydroxide | 0.1 |
| Tert-butylisopropylbenzene hydroperoxide | 0.208 |
| Tetraethylenepentamine | 0.378 |

| | Booster Solutions Added at— | | |
|---|---|---|---|
| | 10.7 Hrs. | 19.2 Hrs. | 34.0 Hrs. |
| Water | | 2.5 | |
| Styrene | 0.104 | | |
| Tert-butylisopropylbenzene hydroperoxide | 0.104 | 0.104 | 0.104 |
| Tetraethylenepentamine | | 0.189 | |

[1] As in Example XXIV.

The reactor was purged with nitrogen and the water, emulsifier, Daxad–11, potassium hydroxide, and potassium chloride charged. This mixture was previously heated to 50–60° C. to dissolve all ingredients and was cooled to room temperature prior to being charged. The pH of this solution was 11.8. The temperature was next adjusted to 5° C. and a mixture of the amine in three parts water was introduced. A solution of the mercaptan in styrene was added followed by the butadiene after which the temperature was adjusted again to 5° C. and the hydroperoxide finally introduced. The reactor was then pressured to 30 pounds per square inch gauge with nitrogen. After a reaction time of 42.2 hours the latex contained 44.3 percent solids. At this point the conversion had reached 75.7 percent.

*Example XXVIII*

Diisopropylchlorobenzene (100 parts), prepared by the alkylation of chlorobenzene with propylene under conditions such as to add two isopropyl groups to the benzene nucleus, was charged to a reactor, together with 1.6 parts of the potassium salt of tert-butylisopropylbenzene hydroperoxide, heated to 130° C., and oxygen introduced at a controlled rate for a two-hour period while the mixture was agitated. At the conclusion of the reaction the concentration of resulting monohydroperoxide in the reaction mixture was 17.0 percent. This material was employed as the oxidant in a series of polymerization runs at 5° C. using the following recipe:

| | Parts by weight |
|---|---|
| Butadiene | 72 |
| Styrene | 28 |
| Water, total | 180 |
| Rosin soap, K salt [1] | 4.7 |
| Mercaptan blend [2] | 0.25 |
| Diisopropylchlorobenzene hydroperoxide (100%) | Variable |
| Potassium hydroxide | 0.037 |
| Potassium chloride | 0.5 |
| Dextrose | 1.0 |
| Activator composition— | |
| $K_4P_2O_7$ | Variable |
| $FeSO_4 \cdot 7H_2O$ | Variable |

[1] pH of emulsifier solution (Dresinate 214), 10.
[2] See Example I.

For the preparation of the activator composition, the following proportions of ingredients were heated at 60° C. for 20 minutes: $K_4P_2O_7$, 0.165 gram (0.50 millimol); $FeSO_4 \cdot 7H_2O$, 0.14 gram (0.50 millimol); water to make 25 ml. of solution.

The dextrose, potassium hydroxide, and 25 parts water were heated at 70° C. for 25 minutes and added to the soap solution. The mercaptan dissolved in the styrene was then added, the temperature adjusted to the desired level, the butadiene introduced followed by the hydroperoxide, and finally the activator composition. Polymerization was effected at 5° C. The time-conversion data are recorded below, together with the amounts of hydroperoxide employed. For purposes of comparison, a control run was made using cumene hydroperoxide in an amount previously found to be optimum for this recipe.

| Hydroperoxide | | $FeSO_4 \cdot 7H_2O$ | | Mols Hydroperoxide/Mol $Fe^{++}$ | Conversion, Percent | | |
|---|---|---|---|---|---|---|---|
| Parts | Millimols | Parts | Millimols | | 2 Hrs. | 5 Hrs. | 7 Hrs. |
| 0.086 | 0.375 | 0.14 | 0.5 | 0.75 | 30.3 | 73.4 | 88.7 |
| 0.114 | 0.5 | 0.14 | 0.5 | 1.0 | 30.1 | 79.4 | 92.0 |
| 0.172 | 0.75 | 0.14 | 0.5 | 1.5 | 28.1 | 76.4 | 90.8 |
| 0.228 | 1.0 | 0.14 | 0.5 | 2.0 | 24.8 | 74.6 | 89.9 |
| [1] 0.1 | 0.66 | 0.14 | 0.5 | 1.3 | 12.5 | 29.5 | 42.0 |

[1] Cumene hydroperoxide (control).

As will be evident to those skilled in the art, various modifications of this invention can be made, or followed, in the light of the foregoing disclosure and discussion,

We claim:

1. A process for producing a polymer which comprises polymerizing a polymerizable organic compound containing a $CH_2=C<$ group in aqueous emulsion at polymerization temperature in the presence of 0.1 to 10 millimols per 100 parts by weight of monomeric material of a hydroperoxide of a substituted benzene having not more than 30 carbon atoms, one substituent group containing at least 3 and not more than 12 carbon atoms, one of said carbon atoms being a tertiary carbon atom attached directly to a carbon atom of the benzene ring, said tertiary carbon atom also having a hydroperoxide group attached thereto, the other carbon atoms of said substituent group forming part of alkyl radicals attached to said tertiary carbon atom, said hydroperoxide containing five additional substituent groups selected from the group consisting of hydrogen and alkyl radicals having 1 to 12 carbon atoms, at least two of said additional substituent groups being hydrogen, one of said substituent groups present containing exactly 12 carbon atoms, 0.1 to 3 millimols per 100 parts by weight of monomeric material of an inorganic ferrous salt, 0.1 to 5.6 millimols per 100 parts by weight of monomeric material of an alkali metal pyrophosphate, the ratio of ferrous salt to pyrophosphate being between 1:.02 and 1:3.5, and 0.02 to 5 parts by weight per 100 parts of monomeric material of a reducing sugar.

2. A process in accordance with claim 1 in which the hydroperoxide is methyldecyl(methylphenyl)hydroperoxymethane.

3. A process in accordance with claim 1 in which the hydroperoxide is methyldecyl(isopropylphenyl)hydroperoxymethane.

4. A process in accordance with claim 1 in which the hydroperoxide is methyldecyl(dodecylphenyl)hydroperoxymethane.

5. A process in accordance with claim 1 in which the hydroperoxide is 2,4,6-trimethylheptylmethyl(phenyl)hydroperoxymethane.

6. A process for producing synthetic rubber which comprises polymerizing a polymerizable organic compound containing a $CH_2=C<$ group in aqueous emulsion at polymerization temperature in the presence of 0.1 to 10 millimols per 100 parts by weight of monomeric material of dimethyl (dodecylphenyl)-hydroperoxymethane, 0.1 to 3 millimols per 100 parts by weight of monomeric material of an inorganic ferrous salt, 0.1 to 5.6 millimols per 100 parts by weight of monomeric material of an alkali metal pyrophosphate, the ratio of ferrous salt to pyrophosphate being between 1:.02 and 1:3.5, and 0.02 to 5 parts by weight per 100 parts of monomeric material of a reducing sugar.

References Cited in the file of this patent

UNITED STATES PATENTS

| | | |
|---|---|---|
| 2,569,480 | Lorand | Oct. 2, 1951 |
| 2,638,464 | Reynolds et al. | May 12, 1953 |
| 2,665,269 | Reynolds et al. | Jan. 5, 1954 |